Figure 1:
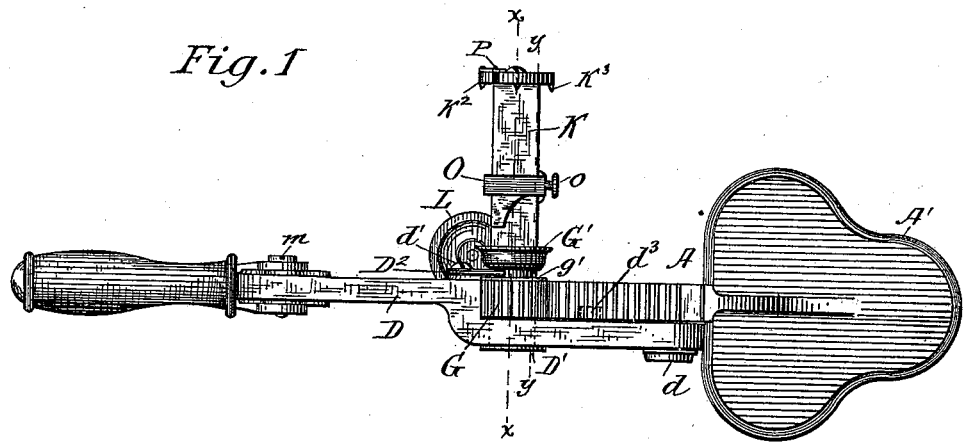

(No Model.) 2 Sheets—Sheet 1.

G. D. HUNTER.
MACHINE FOR CUTTING AND CRIMPING CARTRIDGE SHELLS.

No. 383,529. Patented May 29, 1888.

WITNESSES.

INVENTOR.
George D. Hunter.
By Markle & Mason,
Attorneys.

(No Model.) 2 Sheets—Sheet 2.

G. D. HUNTER.
MACHINE FOR CUTTING AND CRIMPING CARTRIDGE SHELLS.

No. 383,529. Patented May 29, 1888.

WITNESSES:

INVENTOR:
George D. Hunter,
By Marble + Mason,
Attorneys.

N. PETERS, Photo-Lithographer, Washington, D.C.

UNITED STATES PATENT OFFICE.

GEORGE D. HUNTER, OF AUBURN, ILLINOIS, ASSIGNOR OF ONE-HALF TO ELIZABETH HUNTER, OF SAME PLACE.

MACHINE FOR CUTTING AND CRIMPING CARTRIDGE-SHELLS.

SPECIFICATION forming part of Letters Patent No. 383,529, dated May 29, 1888.

Application filed February 2, 1888. Serial No. 262,758. (No model.)

*To all whom it may concern:*

Be it known that I, GEORGE D. HUNTER, a citizen of the United States, residing at Auburn, in the county of Cook and State of Illinois, have invented certain new and useful Improvements in Machines for Cutting and Crimping Cartridge-Shells; and I do hereby declare the following to be a full, clear, and exact description of the invention, such as will enable others skilled in the art to which it appertains to make and use the same.

My invention relates to a portable machine for cutting and crimping cartridge-shells, and embraces improvements upon a machine heretofore invented by me, and for which I filed applications for Letters Patent June 24, 1887, Serial No. 242,396, and November 19, 1887, Serial No. 255,622.

My present invention may be applied to any preferred type of machine for loading cartridge-shells with powder and shot, but preferably to such as that upon which my former inventions above referred to are based, or it may be used as a separate machine for cutting and crimping or finishing cartridge-shells which have been filled by hand; and its essential features consist, first, in improved means for holding the crimping-wheel and chuck-wheel and their pinions upon the hand lever while permitting them to revolve thereon, and also for permitting said wheels and pinions to be readily removed from or replaced upon said hand lever and substituted one for the the other; second, in improved means for supporting, guiding, and actuating the cartridge-carrier; third, in a chuck-wheel supported upon a vibratory hand-lever and adapted to be rotated by the movement of said lever, a pinion and segment-gear for holding the cartridge while the shell thereof is being cut to the required length; fourth, in a carrier provided with an end abutment having a knife supported thereon for cutting cartridges the desired length while being held and revolved by the chuck-wheel, pinion, segment-gear, and vibratory hand-lever, and, fifth, in means for adapting the said chuck-wheel to receive and hold cartridges of various sizes; and the improvement further consists in certain details of construction and arrangements or combinations of parts for the furtherance of the above-named and other objects, as will be hereinafter disclosed in the description and claims and described with reference to the accompanying drawings, wherein the same reference-letters indicate the same or corresponding parts, and wherein—

Figure 3:
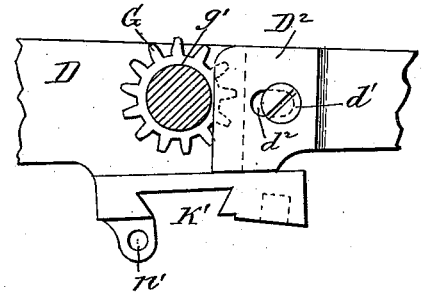
Figure 2:
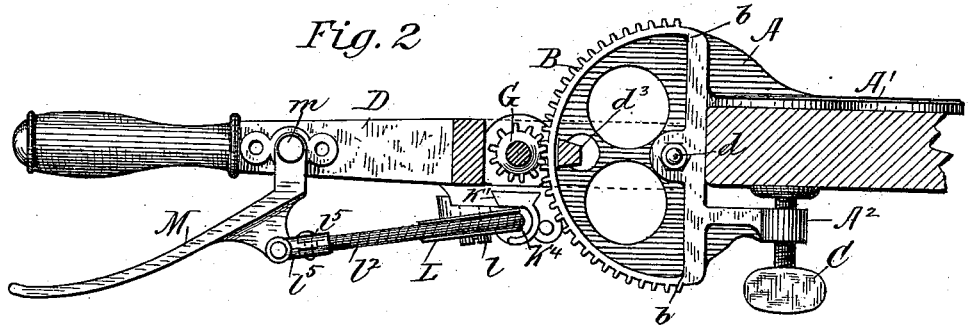
Figure 4:
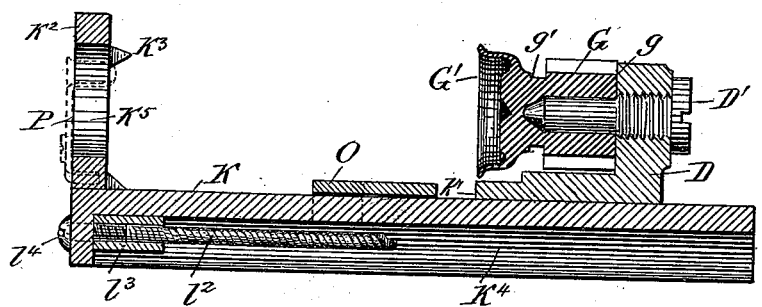
Figure 5:
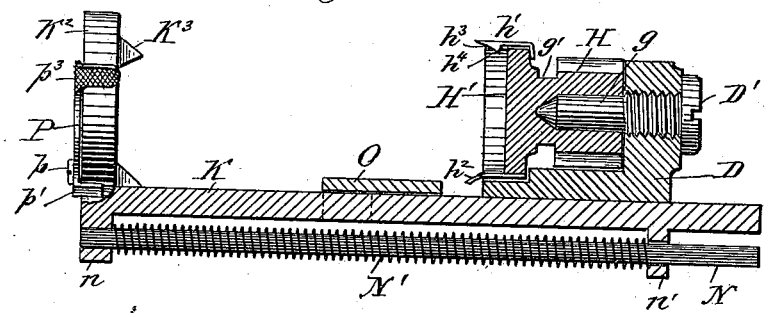
Figure 7:
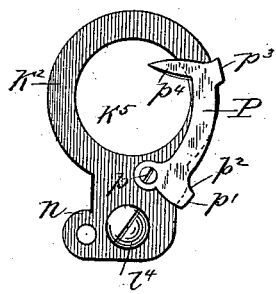
Figure 6:
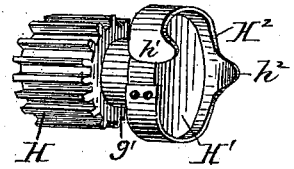

Figure 1 represents a plan view, and Fig. 2 a side elevation, partly in section, of my invention in the form of a special machine for cutting and crimping cartridge-shells; Fig. 3, a side elevation of a portion of the hand-lever, showing the adjustable plate attached thereto for holding and releasing the crimper and chuck wheels and their pinions; Fig. 4, a sectional elevation on the line $x\ x$ of Fig. 1, the crimping-wheel being in working position; Fig. 5, a similar view on the line $y\ y$ of Fig. 1, the chuck-wheel being in working position; Fig. 6, a perspective view of the chuck-wheel and its pinion detached; Fig. 7, an enlarged elevation of the abutment at the outer end of the carrier and the knife pivoted thereon, and Fig. 8 a face view of the chuck-wheel and the spring-plate encircling the same.

A standard or support, A, formed integrally with a segment-rack, B, is provided with jaws A' A², through one of which, A², passes a clamping-screw, C, which binds against the under side of a bench, table, or other support and holds said support and segment-rack securely in the position in which they are placed.

A hand-lever, D, is pivoted concentrically upon the segment-rack B by means of a screw-bolt, $d$, so as to receive a vibratory motion and carry with it either a crimping-wheel and its pinion or a cartridge holding chuck-wheel and its pinion, said pinions being geared and caused to rotate by engagement with said segment-rack.

One side of the vibratory hand-lever D is rectangularly recessed adjacent to the crimper or chuck wheel and its pinion, the lower or horizontal wall of said recess extending laterally beneath said wheel and pinion, as shown in Figs. 4 and 5. Passing through the vertical wall of said recess and screwed therein is a pivot or stud bolt, D', for receiving a pinion, G, carrying a crimping-wheel, G', or a similar pinion, H, carrying a chuck-wheel, H', each of said pinions having an axial recess, $g$, to receive said stud-bolt. A circumferential groove, $g'$, between the head of the crimping-wheel and its pinion and between the chuck-wheel and its pinion, receives the end of a plate, $D^2$, which is firmly held by a screw-bolt, $d'$, upon the hand-lever, and acts to securely hold said pinion from end movement and permit it to revolve freely upon its pivoted stud-bolt, $D'$. A slot, $d^2$, in the plate $D^2$ permits the said plate to slide upon the hand-lever when the screw-bolt $d'$ is loosened, so as to permit the end of said plate to be withdrawn from the groove $g'$, in order that the crimper-wheel and pinion may be removed and the chuck-wheel and pinion substituted therefor, or vice versa, in a simple and effective manner.

To prevent too great throw or movement of the hand-lever as it is vibrated, the segment-gear support is formed at the ends of the cogged rim B with abutment-surfaces $b$ $b$, and the hand-lever is provided with a lateral extension, $d^3$, which projects inside of said cogged rim, as shown in dotted lines in Fig. 1 and in detached section in Fig. 2, and is arranged to contact with either of said abutment-surfaces, and thus avoid too great throw of the hand-lever in its back-and-forth vibrations and the disengagement of the pinion from the segment-gear.

The crimping-wheel may be of any well-known or preferred construction; but the cartridge is supported and carried forward to said crimping-wheel by means of a cartridge-carrier, K, which is supported to slide endwise within a guideway, $K'$, formed in the under side of the hand-lever beneath the crimping-wheel, and is provided with an end abutment, $K^2$, formed with spurs $K^3$, for receiving the rear end of the cartridge.

A pulley, L, supported upon a screw-bolt, $l$, attached to the under side of the hand-lever D, receives a wire cord, $l^2$, which is secured at one end to the outer or abutment end of the carrier K, and at the other end to a grip-lever, M, pivoted at $m$ to the hand-lever, the cord $l^2$ passing through a groove, $K^4$, in the under side of said carrier K. The wire cord $l^2$ is firmly secured at one of its ends to a thimble, $l^3$, by soldering or otherwise, said thimble being arranged and held in the groove $K^4$ in the under side of the carrier by means of a screw, $l^4$, passing through the end of the abutment of said carrier and screwing into the end of said thimble. The other end of said cord is connected with the grip-lever M by a universal-joint connection, consisting of double pivots $l^5$ $l^6$ at right angles to each other, which prevents the cord $l^2$ from buckling and from being pulled off from the grooved periphery of the sheave-pulley, and permits it to be accurately adjusted to the different positions of the grip-lever.

A guide-rod, N, is rigidly secured at its outer end in a downwardly-extending lug, $n$, located beneath the end abutment, $K^2$, of the carrier, and held in parallel relation to the guideway $K'$ of the carrier by passing through a guide-lug, $n'$, depending from the hand-lever. A spiral spring, $N'$, encircles the rod N and presses between the lug $n$ and the lug $n'$, thus serving to press the carrier normally outward or away from the lever and crimper, so as to release the shell or cartridge from the latter after pressure is removed from the grip-lever.

A sliding gage-block, O, is mounted upon the carrier K and secured adjustably thereto by a set-screw, $o$. For crimping, the inner end of this gage-block is arranged at a distance from the hand-lever equal to the amount or distance the front end of the shell is to be turned inward or crimped, so that when the carrier K is moved inwardly the said inner end of the gage-block will abut against the side of the hand-lever, arrest the movement of the carrier and secure the crimping of the shell only to the extent required.

A knife, P, pivoted at $p$ to the abutment $K^2$, has a laterally-projecting guide-flange, $p'$, at its lower end, which moves over a segmental shoulder, $p^2$, on said abutment, and also has a thumb-plate, $p^3$, which projects across the said abutment $K^2$, opposite the knife-blade $p^4$, and permits said knife-blade to be pressed against the shell with sufficient force to cut through and sever the shell, the gage-block O having first been placed upon the carrier in position to determine the extent or length of shell to be severed. This is effected by placing the inner end of said gage-block a distance from the hand-lever equal to the length of the shell which it is desired to cut off, and then moving the carrier inwardly by means of the wire cord and grip-lever until its movement is arrested by the inner end of said gage-block abutting against the side of the hand-lever, when the exact length of shell desired to be removed will project through the opening $K^5$ in the abutment $K^2$ and be in position to be severed by the knife.

Figure 8:
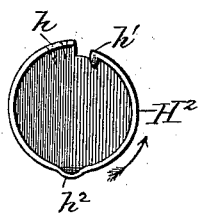

The cartridge, while it is rotated by the pinion H engaging with the segment-rack, is securely held against the face of the chuck-wheel $H'$ by means of a spring-plate, $H^2$, which is secured at one end by the screws $h$ and arranged to encircle the periphery of said chuck-wheel, and is formed with a spur, $h'$, which bites the rim of the shell when the latter is turned in the direction of the inward convolution of the spring, as shown by the arrow in Fig. 8, and releases its grip upon said rim when the shell is turned backward or away from the inward convolution of the spring. Owing to the fact that this spring-plate is only attached at one end to the rim of the chuck-wheel, and consequently is capable of an outward yield, it follows that shells of different sizes may be inserted and firmly held within the same. To this end said spring-plate is provided on its lower portion with an upwardly-inclined lip, $h^2$, for guiding the rim of the shell toward the face of the chuck-wheel, and on its upper portion, on the under side of the spur $h'$, with an outwardly-inclined lip, $h^3$, having a shoulder, $h^4$, in rear of which the rim of the shell is placed and firmly held from movement from the face of the chuck-wheel, the resiliency of said spring-plate permitting it to adjust itself to and hold shells of the sizes ordinarily employed.

The chuck-wheel $H'$ and its pinion H may be readily removed from the hand-lever and substituted by the crimping-wheel $G'$ and pinion G by loosening the screw-bolt $d'$ and sliding the slotted plate $D^2$ upon the hand-lever, so as to release the end of said plate from the recess $g'$.

I operation the chuck-wheel is first placed upon the hand-lever. The gage-block O is then adjusted upon the carrier to suit the required length of the shell. The shell is then taken in the left hand and the upper portion of its rim placed in rear of the shoulder $h^4$ of the spring-plate $H^2$. The lower portion of said rim is then forced inward over the upwardly-inclined lip $h^2$ on the lower portion of said spring-plate, when the rear end of the shell will be in proper position and firmly gripped against the face of the chuck-wheel. The hand-lever and grip-lever are then grasped firmly in the right hand and the former vibrated over the segment-gear, the knife in the meantime being pressed or moved forward by the left hand against the end of the shell, which passes through the opening in the carrier-abutment, and is thus held in unvarying axial position while being cut by the knife and rotated by the chuck-wheel. When the end of the shell is cut off, the grip-lever is released and the spiral spring surrounding the guide-rod forces the carrier outward from the hand-lever and permits the shell to be removed from the chuck-wheel, which and its pinion may then be removed from the hand-lever and the crimping-wheel and its pinion substituted. The cartridge is then placed with the left hand between the abutment of the carrier and the crimper-wheel, when the grip-lever and the hand-lever are again grasped by the right hand and vibrated, which causes the segment-gear to rotate the pinion and crimper-wheel and complete the formation of the cartridge.

Having thus fully described the construction, arrangement, and operation of the various parts of my invention, what I claim as new is—

1. In a machine for cutting and crimping cartridge-shells, the combination of a standard or support formed with a segment-gear upon its face, a vibratory hand-lever pivoted to said support, a pivot or stud bolt supported upon said lever and adapted to fit in a central axial recess formed in a revolving pinion and crimper or chuck wheel, said pinion and wheel having a circumferential groove formed intermediate thereof, and a movable plate, also supported upon said lever and adapted to fit into said groove, substantially as described.

2. In a machine for cutting and crimping cartridge-shells, the combination of a vibratory hand-lever, a cartridge-carrier mounted upon and adapted to slide transversely of the same, a grip-lever and cord connected with said carrier for moving it in one direction, and a spring arranged intermediate of said hand-lever and the outer end of said carrier for positively moving the latter in the opposite direction, substantially as described.

3. In a machine for cutting and crimping cartridge-shells, the combination of a vibratory hand-lever, a revolving crimper or chuck wheel mounted thereon, a cartridge-carrier mounted and adapted to slide upon said hand-lever, a cord and grip-lever connected with said carrier for moving it in one direction, and a guide-rod and spiral spring for moving said carrier in the opposite direction, substantially as described.

4. In a machine for cutting and crimping cartridge-shells, the combination of the vibratory hand-lever, a movable cartridge-carrier mounted and adapted to slide thereon, a grip-lever and sheave-pulley also mounted upon said lever, and a cord secured at one end to said carrier and at the other end to a compound hinge-joint secured to said grip-lever, substantially as described.

5. In a machine for cutting and crimping cartridge shells, the combination of the vibratory hand-lever, a cartridge-carrier mounted and adapted to slide thereon, a grip-lever and sheave-pulley also mounted thereon, and a cord secured at one end to the grip-lever and at the other end to a screw-threaded thimble fastened at the outer end of said carrier by a screw-bolt, substantially as described.

6. In a machine for cutting and crimping cartridge-shells, the combination of a vibratory hand-lever, a revoluble chuck-wheel supported thereon, gearing for revolving said chuck-wheel by the movement of said lever, a cartridge-carrier mounted and adapted to slide upon said lever and provided with an abutment at its outer end having an opening, and a knife supported upon said abutment, substantially as and for the purpose described.

7. In a machine for cutting and crimping cartridge-shells, the combination of a vibratory hand-lever, a revoluble chuck-wheel mounted upon said hand-lever, a cartridge-carrier also mounted upon and adapted to slide transversely of said lever and provided with an open abutment at its outer end, and a knife pivoted to said abutment and provided with a laterally-projecting guide-flange and thumb-piece, substantially as described.

8. In a machine for cutting and crimping cartridge-shells, a revoluble chuck-wheel provided with an encircling spring which is secured at one end to the periphery thereof and which is free or disconnected at its opposite end and adapted to grip and firmly hold a cartridge and prevent the same from independently turning while being revolved, substantially as described.

9. In a machine for cutting and crimping cartridge-shells, a revoluble chuck-wheel provided with an encircling spring which is secured at one end to the periphery thereof and which is free or disconnected at its opposite end, and provided with a spur adapted to grip the rim of a cartridge and hold the same when turned in one direction and to release the same when turned in the opposite direction, substantially as described.

10. In a machine for cutting and crimping cartridge-shells, a revoluble chuck-wheel provided with an encircling spring which is secured at one end to the periphery thereof and which is free or disconnected at its opposite end, and provided with a spur having an outwardly-inclined lip and a shoulder, said spring being also provided on its lower portion with an upwardly-inclined lip, substantially as and for the purpose described.

11. In a machine for cutting and crimping cartridge shells, the combination of the standard or support provided with the segment-gear, the vibratory hand-lever pivoted thereto, the removable chuck-wheel and pinion adapted to be supported upon said hand-lever, a sliding cartridge-carrier also supported upon said hand-lever and provided at its outer end with an abutment having a central opening, a knife pivoted adjacent to said opening, and an adjustable gage-plate mounted upon said carrier, substantially as and for the purpose described.

12. In a machine for cutting and finishing cartridge-shells, the combination of the standard or support provided with the segment-gear and also with abutment-surfaces located at the ends of the cogged rim of said gear, the vibratory hand-lever pivoted to said support and provided with a lateral extension adapted to contact with said abutment-surfaces, and a pinion adapted to rotate a crimper or chuck wheel by engagement with said segment-gear and the vibration of said hand-lever, substantially as and for the purpose described.

In testimony whereof I affix my signature in presence of two witnesses.

GEO. D. HUNTER.

Witnesses:
 AUSTIN SHEUTZ,
 M. G. BOYLE.